United States Patent
Zhang et al.

(10) Patent No.: US 12,506,222 B2
(45) Date of Patent: Dec. 23, 2025

(54) ELECTROCHEMICAL DEVICE INCLUDING SEPARATION LAYER WITH LOW-MELTING POINT POLYMER PARTICLES DISTRIBUTED IN NANOFIBROUS POROUS SUBSTRATE, AND ELECTRONIC DEVICE CONTAINING THE SAME

(71) Applicant: Amperex Technology Limited, Hong Kong (CN)

(72) Inventors: Nan Zhang, Hong Kong (CN); Bin Wang, Hong Kong (CN); Yibo Zhang, Hong Kong (CN); Chi Ho Kwok, Hong Kong (CN); Wai Chung Li, Hong Kong (CN); Chenmin Liu, Hong Kong (CN)

(73) Assignee: Amperex Technology Limited, Hong Kong (CN)

( * ) Notice: Subject to any disclaimer, the term of this patent is extended or adjusted under 35 U.S.C. 154(b) by 601 days.

(21) Appl. No.: 17/953,680

(22) Filed: Sep. 27, 2022

(65) Prior Publication Data
US 2023/0038029 A1     Feb. 9, 2023

Related U.S. Application Data

(63) Continuation of application No. PCT/CN2020/081812, filed on Mar. 27, 2020.

(51) Int. Cl.
| | | |
|---|---|---|
| *H01M 50/446* | (2021.01) | |
| *H01M 10/0525* | (2010.01) | |
| *H01M 50/491* | (2021.01) | |

(52) U.S. Cl.
CPC ..... *H01M 50/446* (2021.01); *H01M 10/0525* (2013.01); *H01M 50/491* (2021.01)

(58) Field of Classification Search
CPC ............. H01M 50/446; H01M 50/491; H01M 10/0525
(Continued)

(56) References Cited

U.S. PATENT DOCUMENTS

2010/0279173 A1* 11/2010 Hying ................ H01M 50/434
427/126.3
2012/0082884 A1   4/2012 Orilall et al.
(Continued)

FOREIGN PATENT DOCUMENTS

CN   101707242 A   5/2010
CN   103311486 A   9/2013
(Continued)

OTHER PUBLICATIONS

Extended European Search Report issued on Jun. 14, 2024, in corresponding European Application No. 20927063.6, 3 pages.
(Continued)

*Primary Examiner* — Sean P Cullen
(74) *Attorney, Agent, or Firm* — Maier & Maier, PLLC

(57) ABSTRACT

An electrochemical device includes an electrode plate and a separation layer on at least one surface of the electrode plate. The separation layer includes a nanofibrous porous substrate including nanofibers and polymer particles distributed in the nanofibrous porous substrate including nanofibers. A melting temperature of the polymer particles is 70° C. to 150° C.

15 Claims, 4 Drawing Sheets

(58) Field of Classification Search
USPC .................................................. 429/251, 254
See application file for complete search history.

(56) References Cited

U.S. PATENT DOCUMENTS

| | | | | |
|---|---|---|---|---|
| 2012/0107656 | A1* | 5/2012 | Tanizaki | H01M 50/414 |
| | | | | 29/623.5 |
| 2015/0147627 | A1* | 5/2015 | Takano | H01M 50/449 |
| | | | | 429/144 |
| 2015/0372271 | A1 | 12/2015 | Orilall et al. | |
| 2016/0285064 | A1* | 9/2016 | Hatta | H02J 7/0068 |
| 2017/0263907 | A1* | 9/2017 | Ameyama | C08F 220/14 |
| 2019/0393541 | A1 | 12/2019 | Jang | |

FOREIGN PATENT DOCUMENTS

| | | | | |
|---|---|---|---|---|
| CN | 103329309 | A | | 9/2013 |
| CN | 104124414 | A | | 10/2014 |
| CN | 106129313 | A | | 11/2016 |
| CN | 108269956 | A | | 7/2018 |
| EP | 1826842 | A1 | | 8/2007 |
| JP | S5265823 | A | | 5/1977 |
| JP | 20084438 | A | | 1/2008 |
| JP | 2011181195 | A | | 9/2011 |
| JP | 20134336 | A | | 1/2013 |
| JP | 2013004336 | A | * | 1/2013 |
| JP | 2013539186 | A | | 10/2013 |
| JP | 2014505339 | A | | 2/2014 |
| JP | 201541601 | A | | 3/2015 |
| JP | 20204684 | A | | 1/2020 |
| KR | 1020060050976 | A | | 5/2006 |
| KR | 1020140146932 | A | | 12/2014 |
| KR | 1020150050060 | A | | 5/2015 |
| KR | 1020150070979 | A | | 6/2015 |
| KR | 2016118979 | A | * | 10/2016 ........ H01M 10/0525 |
| KR | 101735510 | B1 | | 5/2017 |
| WO | 2010117195 | A2 | | 10/2010 |
| WO | 2011062460 | A2 | | 5/2011 |
| WO | 2015065116 | A1 | | 5/2015 |

OTHER PUBLICATIONS

Office Action issued on Mar. 19, 2024, in corresponding Japanese Application No. 2022-558291, 6 pages.
International Search Report issued on Dec. 30, 2020 in corresponding application No. PCT/CN2020/081812; 7 pages (including English translation).
Chinese Office Action issued on Dec. 26, 2023, in corresponding Chinese Application No. 202080095652.1, 18 pages.
Office Action issued on Sep. 26, 2023, in corresponding Japanese Application No. 2022-558291, 8 pages.
Examination Report issued on Jun. 2, 2023, in corresponding Indian Application No. 202227060386, 5 pages.

* cited by examiner

FIG. 8

ELECTROCHEMICAL DEVICE INCLUDING SEPARATION LAYER WITH LOW-MELTING POINT POLYMER PARTICLES DISTRIBUTED IN NANOFIBROUS POROUS SUBSTRATE, AND ELECTRONIC DEVICE CONTAINING THE SAME

CROSS REFERENCE TO THE RELATED APPLICATIONS

The present application is a national phase application of PCT application PCT/CN2020/081812, filed on Mar. 27, 2020, the disclosure of which is hereby incorporated by reference in its entirety.

TECHNICAL FIELD

This application relates to the electrochemical field, and in particular, to an electrochemical device and an electronic device containing the electrochemical device.

BACKGROUND

Lithium-ion batteries are widely used in the field of consumer electronics by virtue of many advantages such as a high energy density, a long cycle life, a high nominal voltage (higher than 3.7 V), and a low self-discharge rate. In recent years, with rapid development of electric vehicles and portable electronic devices, people are posing higher requirements on the energy density (greater than 700 Wh/L), safety, cycle performance (the number of cycles is greater than 500), and the like of the battery, and are expecting the rollout of a new lithium-ion battery with overall performance enhanced comprehensively. Separator-free lithium-ion batteries are a new type of eye-catching lithium-ion battery.

A separator-free lithium-ion battery uses a separation layer on a surface of an electrode plate to replace a conventional separator. The separator-free lithium-ion battery integrates the separation layer on the surface of the electrode plate directly, thereby saving the trouble of making a stand-alone separator. The production process changes from the stacking/winding of triplet "electrode plate—separator—electrode plate" to the stacking/winding of duplet "(integrated) electrode plate—(integrated) electrode plate", thereby simplifying the production process of the battery and reducing the difficulty of manufacturing the battery. In addition, the thinner separation layer increases the energy density of the battery. Further, the separator-free battery technology increases a porosity of the separation layer, and therefore, achieves many advantages such as higher electrolyte retainability and higher reaction kinetics, thereby attracting extensive attention.

Existing separator-free lithium-ion batteries usually employ a non-woven fabric separation layer. The non-woven fabric separation layer is formed by bonding nanoscale or microscale fibers together directionally or randomly. The random lap-joint between the fibers forms a large number of pores configured to transport ions. The fibers themselves serve as a supporting framework of the separation layer. However, such a fibrous layer is not capable of occluding pores under heat, and is unable to cut off an electrical current by melting off a lithium ion path in a case of thermal runaway (caused by battery overcharge, hotbox abuse, vibration, collision, drop, internal short circuit, or external short circuit, or the like), thereby bringing considerable safety hazards to the lithium-ion battery. In addition, the mechanical strength of the fiber layer of the non-woven fabric separation layer is relatively low, and therefore, when the separation layer resists the penetration by positive or negative electrode particles, the positive and negative electrode particles may penetrate the fiber layer and cause an internal short circuit of the electrochemical device. Further, the pore diameters of the fibers of the non-woven fabric separation layer are relatively large and unevenly distributed. The existence of some "macropores" causes severe self-discharge problems to the lithium-ion battery.

SUMMARY

In view of defects in the prior art, a first aspect of this application provides an electrochemical device first. The electrochemical device includes an electrode plate and a separation layer on at least one surface of the electrode plate. The separation layer includes a nanofibrous porous substrate comprising nanofibers and polymer particles distributed in the porous substrate. A melting temperature of the polymer particles is 70° C. to 150° C.

In some preferred embodiments of the first aspect of this application, a number of the polymer particles in the separation layer is $1 \times 10^8 / m^2$ to $1 \times 10^{18} / m^2$.

In some preferred embodiments of the first aspect of this application, an average particle diameter of the polymer particles is 40 nm to 10 μm.

In some preferred embodiments of the first aspect of this application, a diameter of the nanofiber is 10 nm to 5 μm, and a pore diameter of the nanofibrous porous substrate comprising nanofibers is 40 nm to 10 μm.

In some preferred embodiments of the first aspect of this application, a part of the polymer particles protrudes from a surface of the porous substrate by a height of 0.1 nm to 5 μm, and a surface area occupied by the part of the polymer particles on the surface of the porous substrate is 0.1% to 60% of a total surface area of the porous substrate.

In some preferred embodiments of the first aspect of this application, polymers of the polymer particles include at least one of polystyrene, polyethylene, poly(ethylene-co-propylene), poly(ethylene-co-vinyl acetate), acrylonitrile-butadiene-styrene, polylactic acid, polyvinyl chloride, polyvinyl butyral, or polyacrylate.

In some preferred embodiments of the first aspect of this application, the nanofiber includes a polymer. The polymer includes at least one of polyvinylidene difluoride, polyimide, polyamide, polyacrylonitrile, polyethylene glycol, polyethylene oxide, polyphenylene oxide, polypropylene carbonate, polymethyl methacrylate, polyethylene terephthalate, polyvinylidene difluoride-hexafluoropropylene, poly(vinylidene difluoride-co-chlorotrifluoroethylene), or a derivative thereof, and preferably at least one of polyvinylidene difluoride, polyimide, polyamide, polyacrylonitrile, polyethylene glycol, polyethylene oxide, polyphenylene oxide, polypropylene carbonate, polymethyl methacrylate, polyethylene terephthalate, or a derivative thereof.

In some preferred embodiments of the first aspect of this application, a ratio between a cross-sectional void fraction β of the separation layer and a surface porosity α of the separation layer, denoted by β/α, is 95% or less.

In some preferred embodiments of the first aspect of this application, the surface porosity α is 35% to 90%.

In some preferred embodiments of the first aspect of this application, the cross-sectional void fraction β is 30% to 85%.

A second aspect of this application provides an electronic device. The electronic device includes the electrochemical device according to any one of the foregoing technical solutions.

The electronic device according to this application includes an electronic device well known in the art, such as a notebook computer, a mobile phone, an electric motorcycle, an electric vehicle, an electric toy, and the like.

In contrast to the prior art, the low-melting-point polymer particles are distributed in the nanofibrous porous substrate comprising nanofibers of the separation layer according to this application, so that the separation layer is able to occlude pores under heat at a low temperature and cut off a current in a case of thermal runaway, thereby improving safety performance of the electrochemical device. In addition, the low-melting-point polymer particles fill in the "macropores" of the nanofibrous porous substrate comprising nanofibers to reduce the macropores in the purely heat-resistant spinning separation layer, thereby further alleviating the self-discharge problem of the electrochemical device, and reducing the K value. Moreover, the increased mechanical strength of the separation layer reduces the probability of internal short circuits caused by penetration through the separation layer by positive or negative active material particles in the electrochemical device, thereby helping to improve electrochemical performance such as cycle performance of the electrochemical device.

BRIEF DESCRIPTION OF DRAWINGS

To describe the technical solutions in the embodiments of this application or the prior art more clearly, the following outlines the drawings to be used in the embodiments of this application or the prior art. Evidently, the drawings outlined below merely illustrate some embodiments of this application, and a person of ordinary skill in the art may derive other drawings from such drawings without making any creative effort.

FIG. 8 is a schematic diagram of preparing a separation layer according to an embodiment of this application.

REFERENCE NUMERALS

Figure 1:
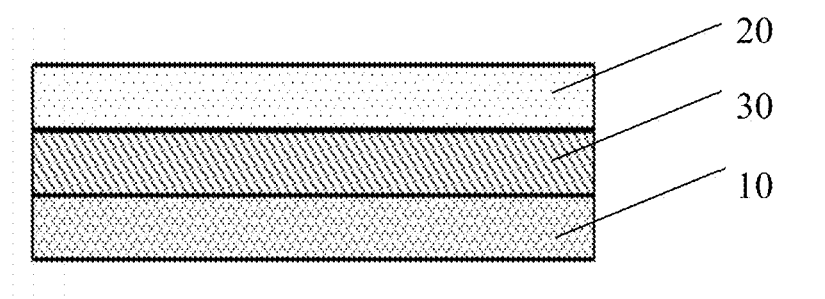
FIG. 1 is a schematic structural diagram of an electrode assembly according to an embodiment of this application.

10: Separation layer;
101: nanofibrous porous substrate comprising nanofibers;
102: Polymer particle;
103: Inorganic particle;
20: Current collector;
201: Positive current collector;
202. Negative current collector;
30: Active material layer;
301: Positive active material layer;
302: Negative active material layer;
40: Conductive layer;
401: Positive conductive layer;
402: Negative conductive layer;
50: Electrospinning apparatus;
60: Electrodeposition apparatus;
70: Voltage regulator.

DETAILED DESCRIPTION

To make the objectives, technical solutions, and advantages of this application clearer, the following describes this application in further detail with reference to drawings and embodiments. Evidently, the described embodiments are merely a part of but not all of the embodiments of this application. All other embodiments derived by a person skilled in the art based on the embodiments of this application without making any creative efforts fall within the protection scope of this application.

The electrochemical device is not particularly limited in this application, and may be any electrochemical device that can use this application, for example, a lithium-ion battery or a super capacitor. For ease of description, the following uses a lithium-ion battery as an example, but this does not mean that the electrochemical device according to this application is limited to a lithium-ion battery.

An aspect of this application provides an electrochemical device. The electrochemical device includes an electrode plate and a separation layer on at least one surface of the electrode plate. The separation layer includes a nanofibrous porous substrate comprising nanofibers and polymer particles distributed in the porous substrate. A melting temperature of the polymer particles is 70° C. to 150° C., preferably 80° C. to 140° C., more preferably 90° C. to 130° C., and optimally 100° C. to 120° C.

In some embodiments of this application, the porous substrate is formed by bonding nanofibers together directionally or randomly. The random lap joint between the nanofibers forms a large number of pores configured to transport ions. The nanofibers themselves serve as a supporting framework of the separation layer. The polymer particles fill in the porous substrate. The melting temperature of polymer particles is relatively low. Therefore, when the electrochemical device is thermally runaway, for example, in a case of battery overcharge, hot box abuse, vibration, collision, drop, internal short circuits, external short circuits, or the like, the temperature of the electrochemical device rises. After the temperature reaches the melting point of the polymer particles, the polymer particles melt to occlude the pores of the separation layer, reduce or obstruct conduction of lithium ions, and reduce or stop charge and discharge of the electrochemical device, thereby greatly improving safety of the electrochemical device. In addition, the melting temperature of the nanofibrous porous substrate comprising nanofibers itself is high. In the case of thermal abuse such as overcharge or hot box abuse, the separation layer maintains the original structure without being ruptured by melting, thereby avoiding internal short circuits. In addition, the polymer particles are distributed in the pores of the porous substrate and fill the macropores in the porous substrate, thereby reducing the self-discharge rate effectively. Moreover, the polymer particles distributed in the porous substrate increase the penetration strength of the porous substrate, thereby effectively preventing short circuits of the electrochemical device caused by the penetration through the separation layer by positive or negative active material particles. Further, a good bonding force exists between the nanofibrous porous substrate comprising nanofibers and the electrode plate, thereby effectively preventing the separator from being folded after being flushed by an electrolytic solution in a process of dropping the electrochemical device, and greatly improving the safety performance of the electrochemical device.

The number of polymer particles in the separation layer is not particularly limited, as long as the objectives of this application can be achieved. In some embodiments of this application, the number of polymer particles in the separation layer is $1\times10^8/m^2$ to $1\times10^{18}/m^2$, preferably $1\times10^9/m^2$ to $1\times10^{16}/m^2$, more preferably $1\times10^{19}/m^2$ to $1\times10^{14}/m^2$, and optimally $1\times10^{11}/m^2$ to $1\times10^{13}/m^2$. By limiting the number of polymer particles within the range specified above, the electrochemical device can respond quickly in a case of thermal runaway, thereby shortening the time taken to occlude the pores by melting, blocking the ion path, and improving the safety performance of the electrochemical device. Further, this makes the separation layer more resistant to penetration, prevents the positive and negative active material particles from penetrating through the separation layer, effectively reduces the macropores in the porous substrate, and decreases the self-discharge rate and the K value.

The particle diameter of the polymer particles is not particularly limited, as long as the objectives of this application can be achieved. In some embodiments of this application, the average particle diameter of the polymer particles is 40 nm to 10 μm, preferably 100 nm to 5 μm, more preferably 200 nm to 2 μm, and optimally 500 nm to 1.5 μm. When the average particle diameter of the polymer particles falls within the range specified above, the macropores in the porous substrate can be reduced or eliminated more effectively, and the self-discharge rate can be reduced. In addition, when the average particle diameter of the polymer particles falls within the range specified above, the pores in the separation layer can be occluded thoroughly and quickly in the case of thermal runaway of the electrochemical device, so as to block the ion conduction path, form an insulation layer, and prevent the battery from catching fire and explosion.

The diameter of the nanoscale or microscale fibers is not particularly limited, as long as the objectives of this application can be achieved. In some embodiments of this application, the diameter of the nanofiber is 10 nm to 5 μm, preferably 20 nm to 2 μm, more preferably 50 nm to 1 μm, and optimally 80 nm to 400 nm. By making the diameter of the nanofiber fall within the range specified above, this application achieves an appropriate porosity of the separation layer, improves the electrolyte retainability of the separation layer, and ensures that the porous substrate is strong enough. The nanofibers coordinate with the polymer particles distributed in the porous substrate to increase the mechanical strength of the separation layer and make the separation layer more resistant to penetration by the positive and negative active material particles. The pore diameter of the porous substrate in the separation layer is not particularly limited, as long as the objectives of this application can be achieved. In some preferred embodiments of this application, the pore diameter of the separation layer of the porous substrate is 40 nm to 10 μm, preferably 80 nm to 5 μm, more preferably 130 nm to 1 μm, and optimally 150 nm to 500 nm. Without being limited to any theory, the inventor of this application holds that the pore diameter of the separation layer of the porous substrate, if falling within the range specified above, can accelerate lithium ion transport, improve reaction kinetics, and at the same time, can effectively reduce the probability of the positive and negative active material particles penetrating through the separation layer, and reduce the self-discharge rate and internal short circuit risks. In addition, in a process of thermal runaway of the electrochemical device, the molten polymer particles can quickly fill up and occlude the pores of the separation layer and obstruct transport of ions, thereby improving the safety performance of the electrochemical device.

In a preferred embodiment of this application, a part of the polymer particles protrudes from a surface of the porous substrate by a height of 0.1 nm to 5 μm, preferably 1 nm to 1 μm, more preferably 2 nm to 500 nm, and optimally 5 nm to 100 nm. Without being limited to any theory, the inventor of this application holds that the polymer particles protruding from the porous substrate by a given height can reduce an acting force exerted by the positive and negative active material particles on the porous substrate, and further prevent the positive and negative electrode particles from penetrating through the separation layer. A surface area occupied by the part of the polymer particles on the surface of the porous substrate is 0.1% to 60%, preferably 0.5% to 45%, more preferably 2% to 30%, and optimally 5% to 15%, of a total surface area of the porous substrate. Without being limited to any theory, the inventor of this application holds that the surface area occupied by the part of the polymer particles protruding from the surface of the porous substrate, if falling within the range specified above, makes the separation layer highly strong and resistant to the penetration by the positive and negative active material particles.

In this application, the "surface of the porous substrate" means: a surface on a side of the separation layer away from the active material layer after the separation layer is applied onto the active material layer.

The type of the polymer of the polymer particles for use in this application is not particularly limited, as long as the melting point of the polymer is 70° C. to 150° C. In some embodiments of this application, the polymer particles include at least one of polystyrene (PS), polyethylene (PE), poly(ethylene-co-propylene), polypropylene (PP), poly(ethylene-co-vinyl acetate), acrylonitrile-butadiene-styrene (ABS), polylactic acid (PLA), polyvinyl chloride (PVC), polyvinyl butyral (PVB), or polyacrylate (PA).

The shape of the polymer particles for use in this application is not particularly limited, and may be at least one of a spherical shape, oval shape, elongated shape, flat shape, pie shape, annular shape, rod shape, hollowed-out shape, spiral shape, core-shell shape, gourd shape, cylinder, cone, cuboid, cube, pyramid, prism, or any other shape.

The nanofiber for use in this application is not particularly limited and may be any material well known to a person skilled in the art, as long as the objectives of this application can be achieved. In some embodiments of this application, the nanofiber includes a polymer. The polymer includes at least one of polyvinylidene difluoride (PVDF), polyimide (PI), polyamide (PA), polyacrylonitrile (PAN), polyethylene glycol (PEG), polyethylene oxide (PEO), polyphenylene oxide (PPO), polypropylene carbonate (PPC), polymethyl methacrylate (PMMA), polyethylene terephthalate (PET), polyvinylidene difluoride-hexafluoropropylene (PVDF-HFP), poly(vinylidene difluoride-co-chlorotrifluoroethylene) (PVDF-PCTFE), or a derivative thereof, and preferably at least one of polyvinylidene difluoride, polyimide, polyamide, polyacrylonitrile, polyethylene glycol, polyethylene oxide, polyphenylene oxide, polypropylene carbonate, polymethyl methacrylate, polyethylene terephthalate, or a derivative thereof. Preferably, in some embodiments of this application, the melting point of the polymer is not lower than 170° C. By virtue of the polymer nanofibers with a melting point not lower than 170° C., in the case of thermal runaway, the polymer particles start to melt at a relatively low temperature, for example, at 70° C. to 150° C., so as to close off the ion transport path of the separation layer. However, the nanofiber framework does not melt at this temperature, but maintains the original structure of the separation layer without melting away, thereby preventing internal short circuits of the battery caused by shrinkage or rupture of the separation layer, and improving the safety of the electrochemical device.

The nanofibrous polymer may further include inorganic particles. The inorganic particles are not particularly limited, and may be inorganic particles well known to a person skilled in the art. For example, the inorganic particles may include at least one of $HfO_2$, $SrTiO_3$, $SiO_2$, $Al_2O_3$, MgO, CaO, NiO, BaO, ZnO, $TiO_2$, $ZrO_2$, $SnO_2$, $CeO_2$, boehmite, magnesium hydroxide, aluminum hydroxide, or the like. The size of the inorganic particles is not particularly limited, and may be, for example, 10 nm to 10 □m. The content of the inorganic particles is not particularly limited, and may be, for example, 0.1% to 80%. The inorganic particles added can further increase the mechanical strength of the separation layer, reduce the self-discharge rate of the electrochemical device, and improve the safety performance of the electrochemical device.

In some preferred embodiments of this application, the surface porosity α of the separation layer is 35% to 90%, preferably 45% to 87%, more preferably 60% to 85%, and optimally 75% to 82%. The cross-sectional void fraction β of the separation layer is 30% to 85%, preferably 40% to 80%, more preferably 50% to 75%, and optimally 55% to 65%. The ratio between the cross-sectional void fraction β of the separation layer and the surface porosity α of the separation layer, denoted by β/α, is 95% or less, preferably 20% to 90%, more preferably 40% to 85%, and optimally 65% to 80%.

By controlling the surface porosity and cross-sectional void fraction of the separation layer within the range specified above, this application increases electrolyte retainability of the separation layer, and keeps appropriate strength and high reaction kinetics of the separation layer.

The thickness of the separation layer according to this application is not particularly limited, and may be selected by a person skilled in the art as specifically required, and is preferably 1 μm to 20 μm, preferably 2 μm to 18 μm, more preferably 5 μm to 15 μm, and optimally 6 μm to 12 μm. The thickness of the separation layer means an overall thickness of the integrated separation layer that includes the nanofibrous porous substrate comprising nanofibers and the polymer particles.

The electrochemical device according to this application may be a lithium-ion battery. The type of the lithium-ion battery is not limited in this application, and may be any type of lithium-ion battery, for example, a button-type, cylindrical, or pouch-type lithium-ion battery.

The lithium-ion battery according to this application includes a positive electrode plate, a negative electrode plate, an electrolytic solution, and a separation layer according to any one of the technical solutions of this application.

In an embodiment of this application, the separation layer may be formed on a surface of the positive electrode plate and a surface of the negative electrode plate, and then the "negative electrode plate+separation layer" and the "positive electrode plate+separation layer" are stacked together to form a stacked structure of the lithium-ion battery.

In another embodiment of this application, the separation layer may be formed on both surfaces of the positive electrode plate, and then the negative electrode plate, and the "separation layer+positive electrode plate+separation layer" may be stacked together to form a stacked structure of the lithium-ion battery, without applying a separation layer onto the surface of the negative electrode plate.

In another embodiment of this application, the separation layer may be formed on both surfaces of the negative electrode plate, and then the positive electrode plate, and the "separation layer+negative electrode plate+separation layer" may be stacked together to form a stacked structure of the lithium-ion battery, without applying a separation layer onto the surface of the positive electrode plate.

The stacked structure formed in this way may be further stacked in the foregoing sequence, or may be wound directly to form a multilayer stacked structure of the lithium-ion battery. The stacking method is not particularly limited in this application, and may be selected by a person skilled in the art as actually required.

FIG. 1 is a schematic structural diagram of an electrode assembly according to an embodiment of this application, in which the separation layer is disposed on one surface of the electrode plate. The separation layer 10 overlays the surface of an electrode active material layer 30. The electrode active material layer 30 is located on one surface of a current collector 20.

Figure 2:
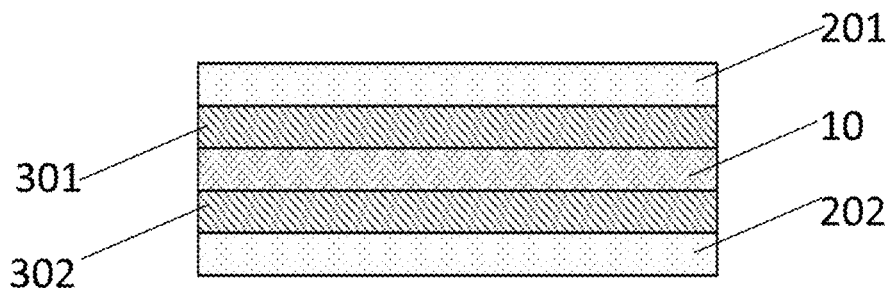
FIG. 2 is a schematic structural diagram of an electrode assembly according to an embodiment of this application.

FIG. 2 is a schematic structural diagram of an electrode assembly according to an embodiment of this application, in which the separation layer 10 is located between a positive active material layer 301 and a negative active material layer 302. The positive active material layer 301 is located on one surface of the positive current collector 201, and the negative active material layer 302 is located on one surface of the negative current collector 202.

Figure 3:
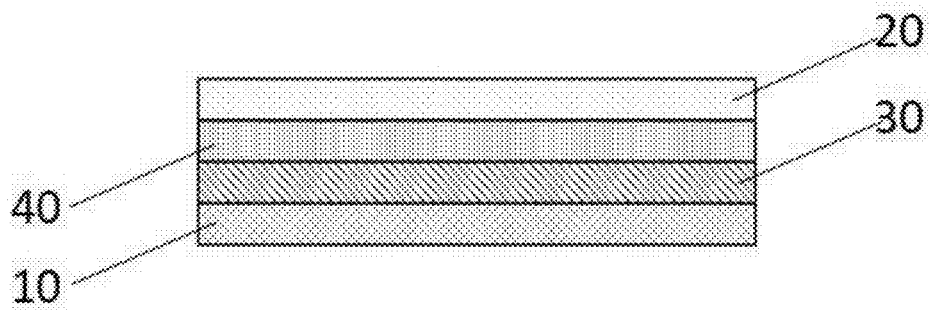
FIG. 3 is a schematic structural diagram of an electrode assembly according to an embodiment of this application.

FIG. 3 is a schematic structural diagram of an electrode assembly according to an embodiment of this application, in which a conductive layer 40 is further included. The conductive layer is located between the electrode active material layer 30 and the current collector 20. The separation layer 10 overlays the surface of the electrode active material layer 30.

Figure 4:
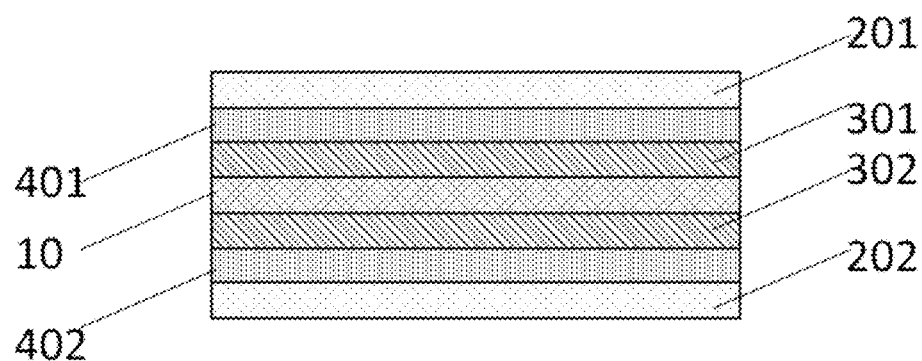
FIG. 4 is a schematic structural diagram of an electrode assembly according to an embodiment of this application.

FIG. 4 is a schematic structural diagram of an electrode assembly according to an embodiment of this application, in which a positive conductive layer 401 and a negative conductive layer 402 are further included. The positive conductive layer 401 is located between the positive current collector 201 and the positive active material layer 301, and the negative conductive layer 402 is located between the negative current collector 202 and the negative active material layer 302.

Figure 5:
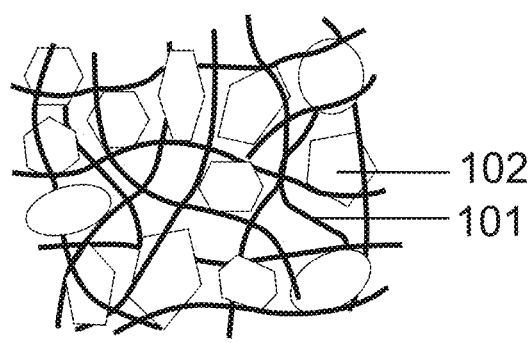
FIG. 5 is a schematic structural diagram of a separation layer according to an embodiment of this application.

FIG. 5 is a schematic structural diagram of a separation layer according to an embodiment of this application, in which the polymer particles 102 are located in the nanofibrous substrate 101.

Figure 6:
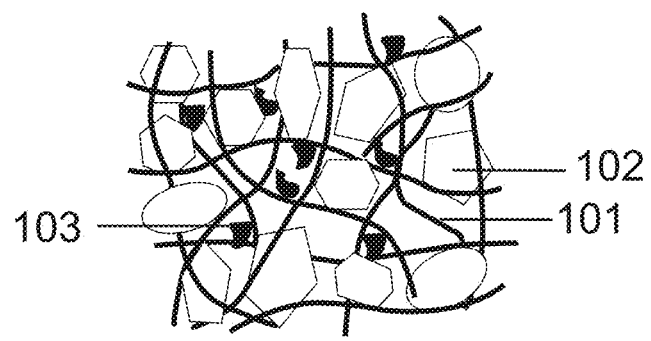
FIG. 6 is a schematic structural diagram of a separation layer according to an embodiment of this application.

FIG. 6 is a schematic structural diagram of a separation layer according to an embodiment of this application, in which the polymer particles 102 and the inorganic particles 103 are located in the nanofibrous substrate 101.

In embodiments of this application, the positive electrode plate is not particularly limited, as long as the objectives of this application can be achieved. For example, the positive electrode plate generally includes a positive current collector and a positive active material. The positive current collector is not particularly limited, and may be any positive current collector well known in the art. For example, the positive current collector may be an aluminum foil, an aluminum alloy foil, or a composite current collector. The positive active material is not particularly limited, and may be any positive active material in the prior art. The active material includes at least one of NCM811, NCM622, NCM523, NCM111, NCA, lithium iron phosphate, lithium cobaltate, lithium manganate, lithium manganese iron phosphate, or lithium titanate.

Optionally, the positive electrode plate may further include a conductive layer. The conductive layer is located between the positive current collector and the positive active material. The composition of the conductive layer is not particularly limited, and may be a conductive layer commonly used in the art. For example, the conductive layer includes a conductive agent and a binder.

In embodiments of this application, the negative electrode plate is not particularly limited, as long as the objectives of this application can be achieved. For example, the negative electrode plate generally includes a negative current collector and a negative active material. The negative current collector is not particularly limited, and may be any negative current collector known in the art, for example, a copper foil, a copper alloy foil, or a composite current collector. The negative active material is not particularly limited, and may be any negative active material well known in the art. For example, negative active material may include at least one of graphite, hard carbon, soft carbon, silicon, silicon-carbon compound, silicon oxide, or the like.

Optionally, the negative electrode plate may further include a conductive layer. The conductive layer is located between the negative current collector and the negative active material. The composition of the conductive layer is not particularly limited, and may be a conductive layer commonly used in the art. For example, the conductive layer includes a conductive agent and a binder.

The conductive agent is not particularly limited and may be any conductive agent well known in the art, as long as the objectives of this application can be achieved. For example, the conductive agent may include at least one of conductive carbon black (Super P™), carbon nanotubes (CNTs), carbon fiber, graphene, or the like. For example, the conductive agent may be conductive carbon black (Super P™). The binder is not particularly limited and may be any binder well known in the art, as long as the objectives of this application can be achieved. For example, the binder may include at least one of styrene-butadiene rubber (SBR), polyvinyl alcohol (PVA), polytetrafluoroethylene (PTFE), sodium carboxymethyl cellulose (CMC-Na), or the like. For example, the binder may be styrene butadiene rubber (SBR).

The electrolytic solution of the lithium-ion battery is not particularly limited, and may be any electrolytic well known in the art. The electrolytic solution may be in a gel state, a solid state, or a liquid state. For example, the liquid-state electrolytic solution includes a lithium salt and a nonaqueous solvent.

The lithium salt is not particularly limited, and may be any lithium salt well known in the art, as long as the objectives of this application can be achieved. For example, the lithium salt may include at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiPO_2F_2$, or the like. For example, the lithium salt may be $LiPF_6$.

The nonaqueous solvent is not particularly limited, as long as the objectives of this application can be achieved. For example, the nonaqueous solvent may include at least one of carbonate compound, a carboxylate compound, an ether compound, a nitrile compound, or another organic solvent, or the like.

For example, the carbonate compound may include at least one of diethyl carbonate (DEC), dimethyl carbonate (DMC), dipropyl carbonate (DPC), methyl propyl carbonate (MPC), ethylene propyl carbonate (EPC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or the like.

The method for preparing the electrochemical device is not particularly limited in this application, and may be any method well known in the art. For example, the electrochemical device may be prepared by depositing nanofibers and polymer particles on one surface or both surfaces of the positive electrode plate or negative electrode plate to form a porous substrate containing the nanofibers and polymer particles that fill in the porous substrate.

Alternatively, the electrochemical device may be prepared by depositing nanofibers, polymer particles, and inorganic particles on one surface or both surfaces of the positive electrode plate or negative electrode plate to form a porous substrate containing the nanofibers as well as polymer particles and inorganic particles that fill in the porous substrate.

The method for depositing the nanofibers, polymer particles and/or inorganic particles is not particularly limited, and may be any deposition method well known in the art. For example, the porous substrate is prepared by electrospinning, air spinning, centrifugal spinning, electro-blown spinning, melt-blown spinning, flash evaporation, or coating. The polymer particles and/or inorganic particles are prepared by electrodeposition, printing, coating, spin-coating, or dip-coating. The sequence of depositing the nanofibers, the polymer particles and/or the inorganic particles is not particularly limited, as long as the separation layer according to this application can be formed. The separation layer includes a nanofibrous porous substrate comprising nanofibers as well as the polymer particles and/or inorganic particles distributed in the porous substrate. For example, the nanofibers as well as the polymer particles and/or inorganic particles may be deposited simultaneously or alternately.

Figure 7:
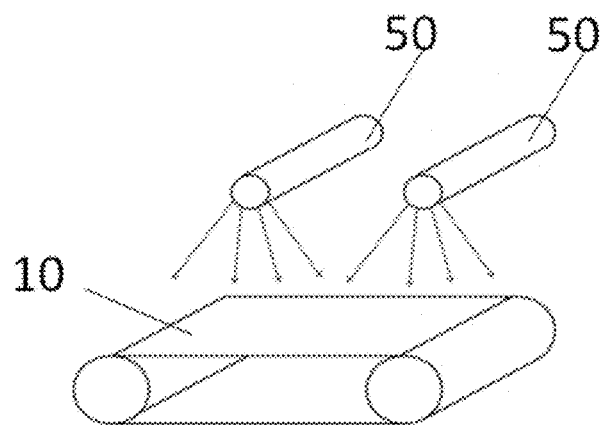
FIG. 7 is a schematic diagram of preparing a separation layer according to an embodiment of this application.

FIG. 7 is a schematic diagram of an electrospinning process according to this application. An electrospinning apparatus 50 deposits nanofibers on the electrode surface to form a separation layer 10.

Figure 8:
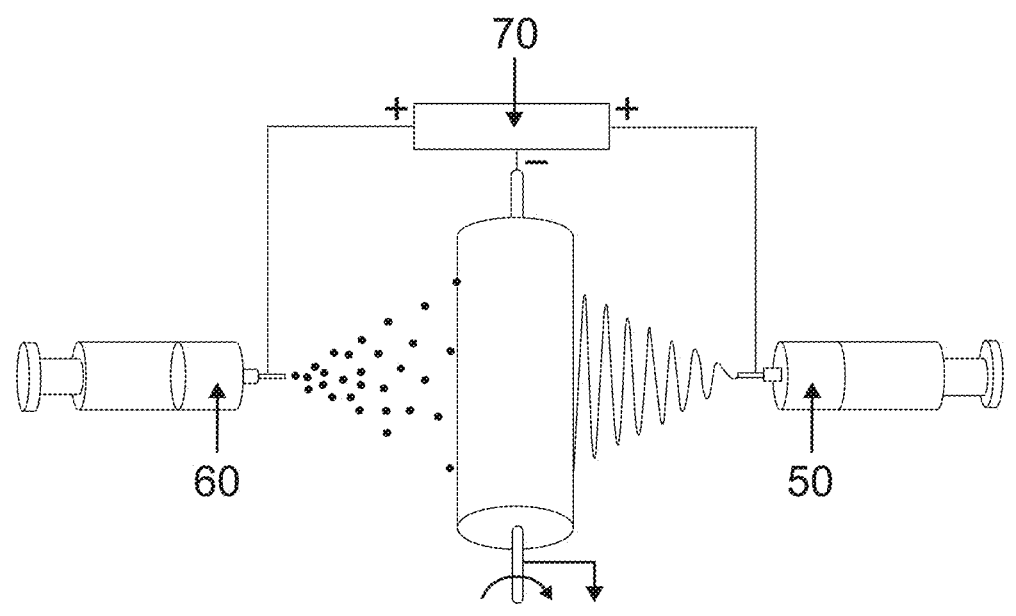

FIG. 8 is a schematic diagram of preparing a separation layer according to an embodiment of this application, in which the electrospinning apparatus 50 and the electrodeposition apparatus 60 deposit the nanofibers and the polymer particles on the electrode surface respectively. Both the electrospinning apparatus 50 and the electrodeposition apparatus 60 are connected to a voltage regulator 70.

The porous substrate may be prepared by any spinning equipment known in the art, without being particularly limited, as long as the objectives of this application can be achieved. The electrospinning method may be performed by any electrospinning equipment known in the art. For example, the electrospinning equipment may be a Ucalery Elite series, or the like. The air spinning method may be performed by any air spinning equipment known in the art. For example, the air spinning equipment may be an air jet spinning machine manufactured by Nanjing Janus New-Materials Co., Ltd. The centrifugal spinning method may be performed by any centrifugal spinning equipment known in the art. For example, the centrifugal spinning equipment may be a centrifugal spinning machine manufactured by Sichuan Zhiyan Technology Co., Ltd., or the like. The electrodeposition method may be implemented by any equipment known in the art, without being particularly limited, as long as the objectives of this application can be achieved. The electrospray method may be implemented by any electrospray equipment known in the art, for example, by electrostatic spraying equipment manufactured by Sames, France.

This application further provides an electronic device. The electronic device includes the electrochemical device according to this application.

The electronic device according to this application includes an electronic device commonly used in the art, such as a notebook computer, a mobile phone, an electric motorcycle, an electric vehicle, an electric toy, and the like.

The terms used in this application are generally terms that are commonly used by a person skilled in the art. If a term used herein is inconsistent with the commonly used terms, the term used in this application prevails.

Specifically, the following terms in this application have the following meanings:

Cross-sectional void fraction: a percentage of a void area on any cross-section perpendicular to the surface of the separation layer in a total area of the cross-section.

Surface porosity: a percentage of a surface area of open pores on the surface of the separation layer in a total surface area of the surface.

Number of polymer particles: a total number of polymer particles per unit area of the separation layer.

Average particle diameter of polymer particles: The average particle diameter of polymer particles is represented by $D_{50}$, where D represents the diameter of the polymer particles, and $D_{50}$ is a particle diameter measured when a cumulative volume percent of measured polymer particles reaches 50% of the total volume of all specimen particles in a volume-based particle size distribution, and physically represents a particle diameter than which 50% of aggregate particles are larger and the remaining 50% of aggregate particles are smaller.

Test Methods

Method for testing a temperature at which the pores of the separation layer can be occluded:

Soaking a specimen of "positive current collector coated with an active material on a single side+separation layer+ negative current collector coated with an active material on a single side" in an electrolytic solution, where the active materials are adjacent to the separation layer. Placing a plurality of thermometer probes at the separation layer. Placing the foregoing specimen on a test fixture board. Applying a 10 MPa pressure and connecting the specimen to an AC impedance tester, and then placing the specimen into a 50° C. oven. Increasing the temperature at a speed of 2° C./min. Recording a temperature when the resistance reaches 1000Ω. This temperature is a temperature at which the pores of the separation layer can be occluded.

Method for testing a temperature at which the separation layer is ruptured:

Placing a specimen of "positive current collector coated with an active material on a single side+separation layer+ negative current collector coated with an active material on a single side" onto a test fixture board. Placing a plurality of thermometer probes at the separation layer, and then applying a pressure of 10 MPa. Connecting the specimen to a conductivity tester, and then putting the specimen into a 50° C. oven, and increasing the temperature at a speed of 2° C./min. When the conductivity tester displays a readout of the conductivity, the temperature measured is a temperature at which the separation layer is ruptured.

Method for testing 1 C-1.5 U (where U is a cut-off voltage) 1 h overcharge performance:

Discharging the lithium-ion battery until the voltage reaches 3.0 V, and then charging the battery at a constant current of 1 C until the voltage reaches 1.5 U, and then charging the battery at a constant voltage for 1 hour. If no fire or explosion occurs, the battery has passed the test and is recorded as "pass".

Method for testing 150° C. and 1 h hot box abuse performance:

Putting a fully charged lithium-ion battery into an oven, increasing the temperature in the oven to 150° C. at a speed of 5±2° C./min, and keeping the temperature for 1 hour before the temperature rise stops. If no fire or explosion occurs, the battery has passed the test and is recorded as "pass".

Method for Testing the Porosity c of the Separation Layer

The porosity c of the separation layer is calculated according to the measured weight ($M_{separation\ layer}$) and volume ($V_{separation\ layer}$) of the separation layer, the weight percent ($w_{porous\ substrate}$) of the porous substrate and the weight percent ($w_{polymer\ particles}$) of the polymer particles based on a total weight of the separation layer, the density ($\rho_{porous\ substrate}$) of the porous substrate, and the density ($\rho_{polymer\ particles}$) of the polymer particles by using the following formula: $\varepsilon = (V_{separation\ layer} - V_{porous\ substrate} - V_{polymer\ particles})/V_{separation\ layer} \times 100\%$, where $V_{porous\ substrate} = M_{separation\ layer} \times w_{porous\ substrate}/\rho_{porous\ substrate}$; and $V_{polymer\ particles} = M_{separation\ layer} \times w_{polymer\ particles}/\rho_{polymer\ particles}$.

Method for testing the cross-sectional void fraction $\beta$:

Observing the cross-section of the prepared separation layer under a scanning electron microscope equipped with a given number of reference squares. Selecting a unit area on the cross-section, and counting the squares that overlay voids of the cross-section. Therefore, a ratio of the area of the squares that overlay the voids to the selected area is the cross-sectional void fraction $\beta_1$ of the separation layer. Repeating the foregoing steps. Selecting unit areas from different positions in different cross-sections of the separation layer to determine cross-sectional void fractions $\beta_2$, $\beta_3$, $\beta_4$ ... $\beta_n$, respectively. Therefore, the cross-sectional void fraction $\beta$ of the separation layer is an average value of $\beta_1$, $\beta_2$, $\beta_3$, $\beta_4$ ... $\beta_n$, expressed as: $\beta\ (\%) = n/(\beta_1 + \beta_2 + \beta_3 + \beta_4 + \ldots + \beta_n)$.

Method for testing the surface porosity $\alpha$:

Observing the separation layer under a scanning electron microscope equipped with a given number of reference squares. Selecting a unit area on the separation layer, and counting the squares that overlay pores of the separation layer. Therefore, a ratio of the area of the squares that overlay the pores to the selected area is the surface porosity $\alpha_1$ of the separation layer. Repeating the foregoing steps. Selecting unit areas from different positions on the surface of the separation layer to determine surface porosities $\alpha_2$, $\alpha_3$, $\alpha_4$ ... $\alpha_n$, respectively. Therefore, the surface porosity $\alpha$ of the separation layer is an average value of $\alpha_1$, $\alpha_2$, $\alpha_3$, $\alpha_4$ ... $\alpha_n$, expressed as: $\alpha(\%) = n/(\alpha_1 + \alpha_2 + \alpha_3 + \alpha_4 + \ldots + \alpha_n)$.

Method for testing the self-discharge rate K value of a lithium-ion battery:

Discharging the lithium-ion battery at a current of 0.5 C until the voltage reaches 3.0 V, and leaving the battery to stand for 5 minutes. Subsequently, discharging the lithium-ion battery at a constant current of 0.5 C until the voltage reaches 3.85 V, and then charging the lithium-ion battery at a constant voltage of 3.85 V until the current reaches 0.05 C. Leaving the battery to stand in a 25° C.±3° C. environment for two days, and measuring and recording the voltage OCV1 at this time. Next, leaving the lithium-ion battery to stand under a room temperature for another two days, measuring and recording the voltage OCV2 at this time, and calculating the K value according to the following formula: K (mV/h)=(OCV2−OCV1)/48 h×1000.

Method for testing the ratio η of $50^{th}$-cycle discharge capacity to first-cycle discharge capacity:

Charging a lithium-ion battery at a constant current of 0.5 C until the voltage reaches 4.4 V, and then charging the battery at a constant voltage of 4.4 V until the current reaches 0.05 C. Leaving the battery to stand for 10 minutes in a 25° C.±3° C. environment, and then discharging the battery at a current of 0.5 C until the voltage reaches 3.0 V, and recording the first-cycle discharge capacity as $Q_{1D}$. Repeating the foregoing charge and discharge process for 50 cycles, and recording the discharge capacity at this time as $Q_{50D}$. The capacity retention rate is the ratio of the $50^{th}$-cycle discharge capacity to the first-cycle discharge capacity, and is calculated according to the following formula: η (%)=$Q_{50D}/Q_{1D}$×100%.

EMBODIMENTS

Preparation Example 1: Preparing a Negative Electrode Plate

Mixing graphite (Graphite) as a negative active material, conductive carbon black (Super P™), and styrene butadiene rubber (SBR) at a mass ratio of 96:1.5:2.5, adding deionized water ($H_2O$) as a solvent, blending the mixture into a slurry with a solid content of 70%, and stirring the slurry evenly. Coating one surface of a 8 μm-thick copper foil as a negative current collector with the slurry evenly, and drying the slurry at a temperature of 110° C. to obtain a negative electrode plate of which a single side is coated with a 130 μm-thick negative active material. Repeating the foregoing steps on the other surface of the negative electrode plate to obtain a negative electrode plate coated with the negative active material on both sides. Subsequently, cutting the electrode plate into a size of 41 mm×61 mm for future use.

Preparation Example 2: Preparing a Positive Electrode Plate

Mixing lithium cobalt oxide ($LiCoO_2$) as a positive active material, conductive carbon black (Super P™), and polyvinylidene difluoride (PVDF) at a mass ratio of 97.5:1.0:1.5, adding N-methyl-pyrrolidone (NMP) as a solvent, blending the mixture into a slurry with a solid content of 75%, and stirring the slurry evenly. Coating a 10-μm-thick positive current collector aluminum foil with the slurry evenly on one surface of the current collector, and drying the current collector at a temperature of 90° C. to obtain a positive electrode plate on which the coating layer is 110 μm thick. Repeating the foregoing steps on the other surface of the positive current collector aluminum foil to obtain a positive electrode plate coated on both sides. Cutting, after completion of the coating, the electrode plate into a size of 38 mm×58 mm for future use.

Preparation Example 3: Preparing an Electrolytic Solution

Mixing ethylene carbonate (EC), ethyl methyl carbonate (EMC), and diethyl carbonate (DEC) at a mass ratio of EC:EMC:DEC=30:50:20 in an dry argon atmosphere to form an organic solvent, then adding lithium salt hexafluorophosphate ($LiPF_6$) into the organic solvent to dissolve, and mixing the solution evenly to obtain an electrolytic solution in which a lithium salt concentration is 1.15 mol/L.

The following embodiments illustrate the preparation of an integrated separation layer of "nanofibrous porous substrate+polymer particles" according to this application. The embodiments are illustrated by using a positive electrode plate as an example, and an integrated separation layer is deposited on both surfaces of the positive electrode plate. Understandably, the integrated separation layer may also be deposited on both surfaces of the negative electrode plate instead, or an integrated separation layer is deposited on one surface of the positive electrode plate and one surface of the negative electrode plate separately. Such implementation solutions can also achieve the objectives of this application. A person skilled in the art understands that such implementation solutions still fall within the protection scope of this application.

Embodiment 1

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles by using the suspension B as an ingredient at the same time of electrospinning, so as to form a 10-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 100 nm. The average particle diameter of the chosen low-melting-point polyethylene (PE) particles is 500 nm. The ratio of the average pore diameter of the porous substrate to the average particle diameter of the low-melting-point polyethylene (PE) particles is 1:2.5. That is, the average pore diameter of the nanofibrous porous substrate comprising nanofibers is 200 nm. The weight ratio between the nanofibrous porous substrate comprising nanofibers material and the polymer particles is 95:5. The porosity of the separation layer is 75%. The cross-sectional void fraction β of the separation layer is 53%, the surface porosity α is 88%, and the ratio of the cross-sectional void fraction to the surface porosity, denoted by β/α, is 60%. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 2

Identical to Embodiment 1 except that the weight ratio between the nanofibrous porous substrate comprising nanofibers material and the polymer particles is adjusted to 80:20 according to Table 1, the cross-sectional void fraction β of the separation layer is 56%, the surface porosity α is 80%, and the ratio of the cross-sectional void fraction to the surface porosity, denoted by β/α, is 70%.

Embodiment 3

Identical to Embodiment 1 except that the weight ratio between the nanofibrous porous substrate comprising nanofibers material and the polymer particles is adjusted to 65:35 according to Table 1, the cross-sectional void fraction β of the separation layer is 60%, the surface porosity α is 75%, and the ratio of the cross-sectional void fraction to the surface porosity, denoted by β/α, is 80%.

Embodiment 4

Identical to Embodiment 1 except that the weight ratio between the nanofibrous porous substrate comprising nanofibers material and the polymer particles is adjusted to 35:65 according to Table 1, the cross-sectional void fraction β of the separation layer is 50%, the surface porosity α is 65%, and the ratio of the cross-sectional void fraction to the surface porosity, denoted by β/α, is 77%.

Embodiment 5

Identical to Embodiment 1 except that the weight ratio between the nanofibrous porous substrate comprising nanofibers material and the polymer particles is adjusted to 5:95 according to Table 1, the cross-sectional void fraction β of the separation layer is 35%, the surface porosity α is 40%, and the ratio of the cross-sectional void fraction to the surface porosity, denoted by β/α, is 88%.

Embodiment 6

Identical to Embodiment 3 except that the nanofibrous porous substrate comprising nanofibers material is PI.

Embodiment 7

Identical to Embodiment 3 except that the nanofibrous porous substrate comprising nanofibers material is PAN.

Embodiment 8

Identical to Embodiment 3 except that the polymer particle material is ABS.

Embodiment 9

Identical to Embodiment 3 except that the polymer particle material is PVB.

Embodiment 10

Identical to Embodiment 3 except that the average particle diameter of the polymer particles is adjusted to 200 nm according to Table 1 so that the ratio of the pore diameter of the nanofibrous porous substrate comprising nanofibers to the average particle diameter of the polymer particles is 1:1, the cross-sectional void fraction β of the separation layer is 55%, the surface porosity α is 70%, and the ratio of the cross-sectional void fraction to the surface porosity, denoted by β/α, is 78%.

Embodiment 11

Identical to Embodiment 3 except that the average particle diameter of the polymer particles is adjusted to 1000 nm according to Table 1 so that the ratio of the pore diameter of the nanofibrous porous substrate comprising nanofibers to the average particle diameter of the polymer particles is 1:5, the cross-sectional void fraction β of the separation layer is 60%, the surface porosity α is 80%, and the ratio of the cross-sectional void fraction to the surface porosity, denoted by β/α, is 75%.

Embodiment 12

Identical to Embodiment 3 except that the average particle diameter of the polymer particles is adjusted to 3000 nm according to Table 1 so that the ratio of the pore diameter of the nanofibrous porous substrate comprising nanofibers to the average particle diameter of the polymer particles is 1:15, the cross-sectional void fraction β of the separation layer is 65%, the surface porosity α is 85%, and the ratio of the cross-sectional void fraction to the surface porosity, denoted by β/α, is 75%.

Embodiment 13

Identical to Embodiment 3 except that the pore diameter of the nanofibrous porous substrate comprising nanofibers is adjusted to 40 nm according to Table 1, the fiber diameter is adjusted to 10 nm, the average particle diameter of the polymer particles is adjusted to 10000 nm, the cross-sectional void fraction β of the separation layer is 60%, the surface porosity α is 75%, and the ratio of the cross-sectional void fraction to the surface porosity, denoted by β/α, is 80%.

Embodiment 14

Identical to Embodiment 3 except that the pore diameter of the nanofibrous porous substrate comprising nanofibers is adjusted to 1000 nm according to Table 1, the fiber diameter is adjusted to 400 nm, the size of the polymer particles is adjusted to 5000 nm, the cross-sectional void fraction β of the separation layer is 65%, the surface porosity α is 80%, and the ratio of the cross-sectional void fraction to the surface porosity, denoted by β/α, is 81%.

Embodiment 15

Identical to Embodiment 3 except that the pore diameter of the nanofibrous porous substrate comprising nanofibers is adjusted to 40 nm according to Table 1, the fiber diameter is adjusted to 20 nm, the average particle diameter of the polymer particles is adjusted to 40 nm, the cross-sectional void fraction β of the separation layer is 50%, the surface porosity α is 70%, and the ratio of the cross-sectional void fraction to the surface porosity, denoted by β/α, is 71%.

Embodiment 16

Identical to Embodiment 11 except that the thickness of the separation layer is adjusted to 5 μm according to Table 1, the cross-sectional void fraction β of the separation layer is 65%, the surface porosity α is 80%, and the ratio of the cross-sectional void fraction to the surface porosity, denoted by β/α, is 81%.

Embodiment 17

Identical to Embodiment 11 except that the porosity of the separation layer is adjusted to 30% according to Table 1, the cross-sectional void fraction β of the separation layer is 25%, the surface porosity α is 35%, and the ratio of the cross-sectional void fraction to the surface porosity, denoted by β/α, is 71%.

Embodiment 18

Identical to Embodiment 11 except that the porosity of the separation layer is adjusted to 30% according to Table 1, the cross-sectional void fraction β of the separation layer is 80%, the surface porosity α is 85%, and the ratio of the cross-sectional void fraction to the surface porosity, denoted by β/α, is 94%.

Embodiment 19

Identical to Embodiment 11 except that the low-melting-point polymer particle material is replaced by EVA with a melting point of 70° C., the cross-sectional void fraction β of the separation layer is 65%, the surface porosity α is 80%, and the ratio of the cross-sectional void fraction to the surface porosity, denoted by β/α, is 81%.

Embodiment 20

Identical to Embodiment 11 except that the low-melting-point polymer particle material is replaced by PP with a melting point of 150° C., the cross-sectional void fraction β of the separation layer is 65%, the surface porosity α is 80%, and the ratio of the cross-sectional void fraction to the surface porosity, denoted by β/α, is 81%.

Embodiment 21

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles onto the same surface of the positive electrode plate by using the suspension B as an ingredient at the same time of electrospinning, so as to form a 10-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 100 nm. The average particle diameter of the chosen low-melting-point polyethylene (PE) particles is 10000 nm. The ratio of the average pore diameter of the nanofibrous porous substrate comprising nanofibers to the average particle diameter of the low-melting-point polyethylene (PE) particles is 1:50. That is, the average pore diameter of the nanofibrous porous substrate comprising nanofibers is 200 nm. The weight ratio between the nanofibrous porous substrate comprising nanofibers material and the polymer particles is 95:5. The porosity of the separation layer is 90%. The number of the polymer particles per unit area of the porous substrate is $1 \times 10^8/m^2$. The cross-sectional void fraction β of the separation layer is 75%, the surface porosity α is 90%, and the ratio of the cross-sectional void fraction to the surface porosity, denoted by β/α, is 83%. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 22

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles by using the suspension B as an ingredient at the same time of electrospinning, so as to form a 20-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 10 nm. The average particle diameter of the chosen low-melting-point polyethylene (PE) particles is 40 nm. The ratio of the average pore diameter of the fibrous substrate to the average particle diameter of the low-melting-point polyethylene (PE) particles is 1:1. That is, the average pore diameter of the nanofibrous porous substrate comprising nanofibers is 40 nm. The weight ratio between the nanofibrous porous substrate comprising nanofibers material and the polymer particles is 5:95. The porosity of the separation layer is 30%. The number of the polymer particles per unit area of the porous substrate is $4 \times 10^{17}/m^2$. The cross-sectional void fraction β of the separation layer is 25%, the surface porosity α is 45%, and the ratio of the cross-sectional void fraction to the surface porosity, denoted by β/α, is 56%. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 23

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles by using the suspension B as an ingredient at the same time of electrospinning, so as to form a 1-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 100 nm. The average particle diameter of the chosen low-melting-point polyethylene (PE) particles is 1000 nm. The ratio of the average pore diameter of the fibrous substrate to the average particle diameter of the low-melting-point polyethylene (PE) particles is 1:5. That is, the average pore diameter of the nanofibrous porous substrate comprising nanofibers is 200 nm. The weight ratio between the nanofibrous porous substrate comprising nanofibers material and the polymer particles is 95:5. The porosity of the separation layer is 90%. The weight of the polymer particles per unit area of the porous substrate is 0.004 g/m². The cross-sectional void fraction $\beta$ of the separation layer is 70%, the surface porosity $\alpha$ is 85%, and the ratio of the cross-sectional void fraction to the surface porosity, denoted by $\beta/\alpha$, is 82%. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 24

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles by using the suspension B as an ingredient at the same time of electrospinning, so as to form a 20-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 10 nm. The average particle diameter of the chosen low-melting-point polyethylene (PE) particles is 40 nm. The ratio of the average pore diameter of the fibrous substrate to the average particle diameter of the low-melting-point polyethylene (PE) particles is 1:1. That is, the average pore diameter of the nanofibrous porous substrate comprising nanofibers is 40 nm. The weight ratio between the nanofibrous porous substrate comprising nanofibers material and the polymer particles is 5:95. The porosity of the separation layer is 30%. The weight of the polymer particles per unit area of the porous substrate is 20 g/m². The cross-sectional void fraction $\beta$ of the separation layer is 25%, the surface porosity $\alpha$ is 45%, and the ratio of the cross-sectional void fraction to the surface porosity, denoted by $\beta/\alpha$, is 56%. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 25

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles by using the suspension B as an ingredient at the same time of electrospinning, so as to form a 20-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 100 nm. The average particle diameter of the chosen low-melting-point polyethylene (PE) particles is 10000 nm. The ratio of the average pore diameter of the fibrous substrate to the average particle diameter of the low-melting-point polyethylene (PE) particles is 1:1. That is, the average pore diameter of the nanofibrous porous substrate comprising nanofibers is 10000 nm. The weight ratio between the nanofibrous porous substrate comprising nanofibers material and the polymer particles is 65:35. The porosity of the separation layer is 75%. The cross-sectional void fraction $\beta$ of the separation layer is 60%, the surface porosity $\alpha$ is 80%, and the ratio of the cross-sectional void fraction to the surface porosity, denoted by $\beta/\alpha$, is 75%. The height by which the polymer particles protrude beyond the surface of the nanofibrous porous substrate comprising nanofibers is 5000 nm. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 26

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles by using the suspension B as an ingredient at the same time of electrospinning, so as to form a 20-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 1000 nm. The average particle diameter of the chosen low-melting-point polyethylene (PE) particles is 10000 nm. The ratio of the average pore diameter of the fibrous substrate to the average particle diameter of the low-melting-point polyethylene (PE) particles is 1:5. That is, the average pore diameter of the nanofibrous porous substrate comprising nanofibers is 2000 nm. The weight ratio between the nanofibrous porous substrate comprising nanofibers material and the polymer particles is 5:95. The porosity of the separation layer is 30%. The cross-sectional void fraction β of the separation layer is 25%, the surface porosity α is 35%, and the ratio of the cross-sectional void fraction to the surface porosity, denoted by β/α, is 71%. The surface area occupied by the polymer particles on the surface of the separation layer is 60% of the total surface area of the separation layer. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 27

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles by using the suspension B as an ingredient at the same time of electrospinning, so as to form a 10-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 100 nm. The average particle diameter of the chosen low-melting-point polyethylene (PE) particles is 1000 nm. The ratio of the average pore diameter of the fibrous substrate to the average particle diameter of the low-melting-point polyethylene (PE) particles is 1:5. That is, the average pore diameter of the porous substrate is 200 nm. The weight ratio between the nanofibrous porous substrate comprising nanofibers material and the polymer particles is 65:35, the porosity of the separation layer is 50%, the cross-sectional void fraction β of the separation layer is 45%, the surface porosity α is 60%, and the ratio of the cross-sectional void fraction to the surface porosity, denoted by β/α, is 75%. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 28

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles by using the suspension B as an ingredient at the same time of electrospinning, so as to form a 20-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 100 nm. The average particle diameter of the chosen low-melting-point polyethylene (PE) particles is 10000 nm. The ratio of the average pore diameter of the fibrous substrate to the average particle diameter of the low-melting-point polyethylene (PE) particles is 1:2.5. That is, the average pore diameter of the porous substrate is 4000 nm. The weight ratio between the nanofibrous porous substrate comprising nanofibers material and the polymer particles is 95:5. The porosity of the separation layer is 90%. The cross-sectional void fraction β of the separation layer is 85%, the surface porosity α is 90%, and the ratio of the cross-sectional void fraction to the surface porosity, denoted by β/α, is 94%. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 29

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles by using the suspension B as an ingredient at the same time of electrospinning, so as to form a 10-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 100 nm. The average particle diameter of the chosen low-melting-point polyethylene (PE) particles is 1000 nm. The ratio of the average pore diameter of the fibrous substrate to the average particle diameter of the low-melting-point polyethylene (PE) particles is 1:2.5. That is, the average pore diameter of the porous substrate is 400 nm. The weight ratio between the nanofibrous porous substrate comprising nanofibers material and the polymer particles is 65:35. The porosity of the separation layer is 75%. The cross-sectional void fraction β of the separation layer is 40%, the surface porosity α is 80%, and the ratio of the cross-sectional void fraction to the surface porosity, denoted by β/α, is 50%. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 30

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B. Mixing the inorganic particles aluminum oxide ($Al_2O_3$) and polyvinylidene difluoride (PVDF) at a weight ratio of 90:10, adding N-methyl-pyrrolidone (NMP) as a solvent, and blending the mixture into a slurry C with a solid content of 40%.

Preparing a PVDF nanofibrous porous substrate comprising nanofibers by using the solution A as an ingredient by electrospinning on one surface of the positive electrode plate prepared in Preparation Example 2. Electrospraying the low-melting-point polyethylene (PE) particles and the inorganic particles aluminum oxide ($Al_2O_3$) by using the suspension B and the slurry C as ingredients at the same time of electrospinning, so as to form a 10-μm-thick integrated separation layer of "PVDF nanofibrous porous substrate comprising nanofibers+low-melting-point polymer+inorganic particles", where the low-melting-point polymer particles and the inorganic particles are embedded in the pores of the nanofibrous porous substrate comprising nanofibers. The average diameter of the fibers is 100 nm. The average particle diameter of the chosen low-melting-point polyethylene (PE) particles is 1000 nm. The ratio of the average pore diameter of the fibrous substrate to the average particle diameter of the low-melting-point polyethylene (PE) particles is 1:5. That is, the average pore diameter of the porous substrate is 200 nm. The average particle diameter of the chosen inorganic ceramic ($Al_2O_3$) particles is 400 nm. The weight ratio between the nanofibrous porous substrate comprising nanofibers material, the polymer particles, and the inorganic particles is 60:30:10. The porosity of the separation layer is 70%. The cross-sectional void fraction β of the separation layer is 55%, the surface porosity α is 70%, and the ratio of the cross-sectional void fraction to the surface porosity, denoted by β/α, is 79%. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Embodiment 31

Preparing a Positive Electrode Plate

Mixing conductive carbon black (Super P™), and the styrene butadiene rubber (SBR) at a weight ratio of 97:3, adding deionized water ($H_2O$) as a solvent, blending the mixture into a slurry with a solid content of 85%, and stirring the slurry evenly. Coating a positive current collector aluminum foil with the slurry evenly, and drying under 110° C. to obtain a positive undercoat.

Mixing lithium cobalt oxide ($LiCoO_2$) as a positive active material, conductive carbon black (Super P™), and polyvinylidene difluoride (PVDF) at a mass ratio of 97.5:1.0:1.5, adding N-methyl-pyrrolidone (NMP) as a solvent, blending the mixture into a slurry with a solid content of 75%, and stirring the slurry evenly. Coating an undercoated positive current collector aluminum foil with the slurry evenly, and drying at a temperature of 90° C. to obtain a positive electrode plate. Cutting, after completion of the coating, the electrode plate into a size of 38 mm×58 mm for future use.

Dispersing polyvinylidene difluoride (PVDF) in a solvent of dimethylformamide (DMF) and acetone mixed at a ratio of 7:3, and stirring evenly until the viscosity of the slurry is stable, so as to obtain a 25 wt % solution A. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Preparing a PVDF nanofibrous porous substrate comprising nanofibers by using the solution A as an ingredient by electrospinning on one surface of the positive electrode plate prepared in this embodiment. Electrospraying the low-melting-point polyethylene (PE) particles by using the suspension B as an ingredient at the same time of electrospinning, so as to form a 10-μm-thick integrated separation layer of "fibrous porous substrate+low-melting-point polymer", where the low-melting-point polymer particles are distributed as fillers in the nanofibrous porous substrate comprising nanofibers. The average diameter of the fibers is 100 nm. The average particle diameter of the chosen low-melting-point polyethylene (PE) particles is 1000 nm. The ratio of the average pore diameter of the fibrous substrate to the average particle diameter of the low-melting-point polyethylene (PE) particles is 1:5. That is, the average pore diameter of the porous substrate is 200 nm. The weight ratio between the nanofibrous porous substrate comprising nanofibers material and the polymer particles is 65:35. The cross-sectional void fraction β of the separation layer is 65%, the surface porosity α is 80%, and the ratio of the cross-sectional void fraction to the surface porosity, denoted by β/α, is 81%. Subsequently, repeating the foregoing steps on the other surface of the positive electrode plate, and then vacuum-drying at a temperature of 40° C. to remove the dispersant and solvent such as DMF to obtain a positive electrode plate coated with the separation layer on both sides.

Preparing a Lithium-Ion Battery

Aligning and stacking the negative electrode plate prepared in Preparation Example 1 and the positive electrode plate coated with a separation layer and prepared in each embodiment, as shown in FIG. 2. Fixing four corners of the entire stacked structure by using adhesive tape, and then placing the stacked structure into an aluminum plastic film package. Performing top-and-side sealing, injecting the electrolytic solution prepared in the Preparation Example 3, and sealing the package to obtain a stacked-type lithium-ion battery.

The data and test results of the embodiments are shown in Table 1, Table 2, and Table 3.

Comparative Embodiment 1

Using a 15-μm-thick polyethylene (PE) film as a separator, and placing the separator between the negative electrode plate and the positive electrode plate that are prepared in Preparation Example 1 and Preparation Example 2 respectively. Aligning the negative electrode plate, the positive electrode plate, and the separator and stacking them neatly. Fixing four corners of the entire stacked structure by using adhesive tape, and then placing the stacked structure into an aluminum plastic film package. Performing top-and-side sealing, injecting the electrolytic solution prepared in the Preparation Example 3, and sealing the package to obtain a stacked-type lithium-ion battery.

Comparative Embodiment 2

Dispersing PVDF in a solvent of dimethylformamide (DMF) and acetone mixed at a ratio of 7:3, and stirring evenly until the viscosity of the slurry is stable, so as to obtain a 25 wt % solution A. Making a 10-μm-thick PVDF non-woven fabric fibrous layer by using the solution A as an ingredient by electrospinning on one surface of the positive electrode plate prepared in Preparation Example 2, where the diameter of the fibrous layer is 100 nm, the average pore diameter is 200 nm, and the porosity is 75%. Subsequently, repeating the foregoing steps on the other surface of the positive electrode plate, and drying at a temperature of 90° C. to remove the dispersant from the polymer coating layer to obtain a positive electrode plate overlaid with a PVDF non-woven fabric fibrous layer on both sides.

Aligning and stacking this positive electrode plate and the negative electrode plate prepared in Preparation Example 1, as shown in FIG. 2. Fixing four corners of the entire stacked structure by using adhesive tape, and then placing the stacked structure into an aluminum plastic film package. Performing top-and-side sealing, injecting the electrolytic solution prepared in the Preparation Example 3, and sealing the package to obtain a stacked-type lithium-ion battery.

Comparative Embodiment 3

Using a 15-μm-thick polyethylene (PE) film as a separator. Dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B. Preparing 5-μm-thick coating layer of low-melting-point polyethylene (PE) particles on the surface of the polyethylene separator by electrospraying, where the average particle diameter of the particles is 500 nm. Therefore, the total thickness of the separation layer is 20 μm, and the overall porosity of the separation layer is 30%.

Putting the prepared integrated separator containing the coating layer of the low-melting-point polymer particles between the negative electrode plate and the positive electrode plate that are prepared in Preparation Example 1 and Preparation Example 2 respectively. Aligning the negative electrode plate, the positive electrode plate, and the separator and stacking them neatly. Fixing four corners of the entire stacked structure by using adhesive tape, and then placing the stacked structure into an aluminum plastic film package. Performing top-and-side sealing, injecting the electrolytic solution prepared in the Preparation Example 3, and sealing the package to obtain a stacked-type lithium-ion battery.

Comparative Embodiment 4

Dispersing PVDF in a solvent of dimethylformamide (DMF) and acetone mixed at a ratio of 7:3, and stirring evenly until the viscosity of the slurry is stable, so as to obtain a 25 wt % solution A. At the same time, dispersing low-melting-point polyethylene (PE) particles in a solvent of N-methyl-pyrrolidone (NMP) and acetone mixed at a ratio of 7:3, and stirring evenly until the viscosity of the slurry is stable, so as to obtain a 40 wt % suspension B.

Making a 10-μm-thick PVDF non-woven fabric fibrous layer by using the solution A as an ingredient by electrospinning on one surface of the positive electrode plate prepared in Preparation Example 2, where the average diameter of the fibers is 100 nm, and the average pore diameter of the nanofibrous porous substrate comprising nanofibers is 200 nm. After the electrospinning, electrospraying the low-melting-point polyethylene (PE) particles onto the surface of the nanofibrous porous substrate comprising nanofibers by using the suspension B as an ingredient, where the average particle diameter of the chosen low-melting-point polyethylene (PE) particles is 500 nm, the ratio of the average pore diameter of the nanofibrous porous substrate comprising nanofibers to the average particle diameter of the low-melting-point polyethylene (PE) particles is 1:2.5, and the overall porosity of the separation layer is 75%. Subsequently, repeating the foregoing steps on the other surface of the positive electrode plate, and vacuum-drying at a temperature of 40° C. to remove the dispersant such as DMF to obtain a positive electrode plate coated with the separation layer on both sides.

Aligning and stacking this positive electrode plate and the negative electrode plate prepared in Preparation Example 1, as shown in FIG. 2. Fixing four corners of the entire stacked structure by using adhesive tape, and then placing the stacked structure into an aluminum plastic film package. Performing top-and-side sealing, injecting the electrolytic solution prepared in the Preparation Example 3, and sealing the package to obtain a stacked-type lithium-ion battery.

The data and test results of Comparative Embodiments 1 to 4 are shown in Table 1, Table 2, and Table 3.

TABLE 1

|  | Content of nanofibrous porous substrate comprising nanofibers (wt %) | Content of low-melting-point polymer particles (wt %) | Content of inorganic polymer particles (wt %) | Fibrous porous substrate material | Low-melting-point polymer particle material | Inorganic polymer particle material | Ratio of average pore diameter of nanofibrous porous substrate comprising nanofibers to average particle diameter of low-melting-point polymer particles | Average diameter of fibers (nm) |
|---|---|---|---|---|---|---|---|---|
| Comparative Embodiment 1 | — | — | — | PE | — | — | — | — |
| Comparative Embodiment 2 | 100 | — | — | PVDF | — | — | — | 100 |
| Comparative Embodiment 3 | — | 100 | — | PE | PE | — | — | — |

TABLE 1-continued

| | | | | | | | | |
|---|---|---|---|---|---|---|---|---|
| Comparative Embodiment 4 | — | 100 | — | PVDF | PE- | — | 1:2.5 | 100 |
| Embodiment 1 | 95 | 5 | — | PVDF | PE- | — | 1:2.5 | 100 |
| Embodiment 2 | 80 | 20 | — | PVDF | PE | — | 1:2.5 | 100 |
| Embodiment 3 | 65 | 35 | — | PVDF | PE | — | 1:2.5 | 100 |
| Embodiment 4 | 35 | 65 | — | PVDF | PE- | — | 1:2.5 | 100 |
| Embodiment 5 | 5 | 95 | — | PVDF | PE | — | 1:2.5 | 100 |
| Embodiment 6 | 65 | 35 | — | PI | PE | — | 1:2.5 | 100 |
| Embodiment 7 | 65 | 35 | — | PAN | PE | — | 1:2.5 | 100 |
| Embodiment 8 | 65 | 35 | — | PVDF | ABS | — | 1:2.5 | 100 |
| Embodiment 9 | 65 | 35 | — | PVDF | PVB | — | 1:2.5 | 100 |
| Embodiment 10 | 65 | 35 | — | PVDF | PE | — | 1:1 | 100 |
| Embodiment 11 | 65 | 35 | — | PVDF | PE | — | 1:5 | 100 |
| Embodiment 12 | 65 | 35 | — | PVDF | PE | — | 1:15 | 100 |
| Embodiment 13 | 65 | 35 | — | PVDF | PE | — | 1:250 | 10 |
| Embodiment 14 | 65 | 35 | — | PVDF | PE | — | 1:5 | 400 |
| Embodiment 15 | 65 | 35 | — | PVDF | PE | — | 1:1 | 20 |
| Embodiment 16 | 65 | 35 | — | PVDF | PE | — | 1:5 | 100 |
| Embodiment 17 | 65 | 35 | — | PVDF | PE | — | 1:5 | 100 |
| Embodiment 18 | 65 | 35 | — | PVDF | PE | — | 1:5 | 100 |
| Embodiment 19 | 65 | 35 | — | PVDF | EVA | — | 1:5 | 100 |
| Embodiment 20 | 65 | 35 | — | PVDF | PP | — | 1:5 | 100 |
| Embodiment 21 | 95 | 5 | — | PVDF | PE | — | 1:50 | 100 |
| Embodiment 22 | 5 | 95 | — | PVDF | PE | — | 1:1 | 10 |
| Embodiment 23 | 95 | 5 | — | PVDF | PE | — | 1:5 | 100 |
| Embodiment 24 | 5 | 95 | — | PVDF | PE | — | 1:1 | 10 |
| Embodiment 25 | 65 | 35 | — | PVDF | PE | — | 1:1 | 100 |
| Embodiment 26 | 5 | 95 | — | PVDF | PE | — | 1:5 | 1000 |
| Embodiment 27 | 65 | 35 | — | PVDF | PE | — | 1:5 | 100 |
| Embodiment 28 | 95 | 5 | — | PVDF | PE | — | 1:2.5 | 100 |
| Embodiment 29 | 65 | 35 | — | PVDF | PE | — | 1:2.5 | 100 |
| Embodiment 30 | 60 | 30 | 10 | PVDF | PE | $Al_2O_3$ | 1:5 | 100 |
| Embodiment 31 | 65 | 35 | — | PVDF | PE | — | 1:5 | 100 |

| | Average pore diameter of nanofibrous porous substrate comprising nanofibers (nm) | Average particle diameter of low-melting-point polymer particles (nm) | Average particle diameter of inorganic polymer particle material (nm) | Thickness of separation layer (μm) | Porosity of separation layer (%) | Melting point of low-melting-point polymer particles (° C.) |
|---|---|---|---|---|---|---|
| Comparative Embodiment 1 | | — | — | 15 | 30 | — |
| Comparative Embodiment 2 | 200 | — | — | 10 | 75 | — |
| Comparative Embodiment 3 | | 500 | — | 20 | 30 | 110 |
| Comparative Embodiment 4 | 200 | 500 | — | 15 | 75 | 110 |
| Embodiment 1 | 200 | 500 | — | 10 | 75 | 110 |
| Embodiment 2 | 200 | 500 | — | 10 | 75 | 110 |
| Embodiment 3 | 200 | 500 | — | 10 | 75 | 110 |
| Embodiment 4 | 200 | 500 | — | 10 | 75 | 110 |
| Embodiment 5 | 200 | 500 | — | 10 | 75 | 110 |
| Embodiment 6 | 200 | 500 | — | 10 | 75 | 110 |
| Embodiment 7 | 200 | 500 | — | 10 | 75 | 110 |
| Embodiment 8 | 200 | 500 | — | 10 | 75 | 120 |
| Embodiment 9 | 200 | 500 | — | 10 | 75 | 126 |
| Embodiment 10 | 200 | 200 | — | 10 | 75 | 110 |
| Embodiment 11 | 200 | 1000 | — | 10 | 75 | 110 |
| Embodiment 12 | 200 | 3000 | — | 10 | 75 | 110 |
| Embodiment 13 | 40 | 10000 | — | 10 | 75 | 110 |
| Embodiment 14 | 1000 | 5000 | — | 10 | 75 | 110 |
| Embodiment 15 | 40 | 40 | — | 10 | 75 | 110 |
| Embodiment 16 | 200 | 1000 | — | 5 | 75 | 110 |
| Embodiment 17 | 200 | 1000 | — | 10 | 30 | 110 |
| Embodiment 18 | 200 | 1000 | — | 10 | 90 | 110 |
| Embodiment 19 | 200 | 1000 | — | 10 | 75 | 70 |
| Embodiment 20 | 200 | 1000 | — | 10 | 75 | 150 |
| Embodiment 21 | 200 | 10000 | — | 10 | 90 | 110 |
| Embodiment 22 | 40 | 40 | — | 20 | 30 | 110 |
| Embodiment 23 | 200 | 1000 | — | 1 | 90 | 110 |
| Embodiment 24 | 40 | 40 | — | 20 | 30 | 115 |
| Embodiment 25 | 10000 | 10000 | — | 20 | 75 | 110 |
| Embodiment 26 | 2000 | 10000 | — | 20 | 30 | 110 |
| Embodiment 27 | 200 | 1000 | — | 10 | 50 | 110 |
| Embodiment 28 | 4000 | 10000 | — | 20 | 90 | 110 |

TABLE 1-continued

| | | | | | | |
|---|---|---|---|---|---|---|
| Embodiment 29 | 400 | 1000 | — | 10 | 75 | 110 |
| Embodiment 30 | 200 | 1000 | 400 | 10 | 70 | 110 |
| Embodiment 31 | 200 | 1000 | — | 10 | 75 | 110 |

TABLE 2

| | Number of polymer particles per unit area of separation layer (/m$^2$) | Weight of polymer particles per unit area of separation layer (g/m$^2$) | Height by which the polymer particles protrude beyond surface of porous substrate (nm) | Surface area occupied by polymer particles on surface of separation layer (%) | Surface porosity α of separation layer (%) | Cross-sectional void fraction β of separation layer (%) | Ratio β/α of cross-sectional void fraction to surface porosity of separation layer (%) |
|---|---|---|---|---|---|---|---|
| Comparative Embodiment 1 | — | — | — | — | 45 | 25 | 55 |
| Comparative Embodiment 2 | — | — | — | — | 90 | 55 | 61 |
| Comparative Embodiment 3 | 2.1 × 10$^{14}$ | 12.9 | 10000 | 65 | 35 | 28 | 80 |
| Comparative Embodiment 4 | 5.7 × 10$^{13}$ | 3.5 | 5000 | 65 | 35 | 40 | 114 |
| Embodiment 1 | 1.9 × 10$^{12}$ | 0.1 | 20 | 2 | 88 | 53 | 60 |
| Embodiment 2 | 7.6 × 10$^{12}$ | 0.5 | 20 | 10 | 80 | 56 | 70 |
| Embodiment 3 | 1.3 × 10$^{13}$ | 0.8 | 20 | 15 | 75 | 60 | 80 |
| Embodiment 4 | 2.5 × 10$^{13}$ | 1.5 | 20 | 30 | 65 | 50 | 77 |
| Embodiment 5 | 3.6 × 10$^{13}$ | 2.2 | 300 | 55 | 40 | 35 | 88 |
| Embodiment 6 | 1.3 × 10$^{13}$ | 0.8 | 20 | 15 | 75 | 60 | 80 |
| Embodiment 7 | 1.3 × 10$^{13}$ | 0.8 | 20 | 15 | 75 | 60 | 80 |
| Embodiment 8 | 1.3 × 10$^{13}$ | 0.9 | 20 | 15 | 75 | 60 | 80 |
| Embodiment 9 | 1.3 × 10$^{13}$ | 0.9 | 20 | 15 | 75 | 60 | 80 |
| Embodiment 10 | 2.1 × 10$^{14}$ | 0.8 | 50 | 20 | 70 | 55 | 78 |
| Embodiment 11 | 1.7 × 10$^{12}$ | 0.8 | 10 | 10 | 80 | 60 | 75 |
| Embodiment 12 | 6.2 × 10$^{10}$ | 0.8 | 3 | 5 | 85 | 65 | 76 |
| Embodiment 13 | 1.7 × 10$^{9}$ | 0.8 | 0.1 | 1 | 75 | 60 | 80 |
| Embodiment 14 | 1.3 × 10$^{10}$ | 0.8 | 50 | 10 | 80 | 65 | 81 |
| Embodiment 15 | 2.6 × 10$^{16}$ | 0.8 | 20 | 20 | 70 | 50 | 71 |
| Embodiment 16 | 8.4 × 10$^{11}$ | 0.4 | 10 | 10 | 80 | 65 | 81 |
| Embodiment 17 | 4.7 × 10$^{12}$ | 2.3 | 10 | 10 | 35 | 25 | 71 |
| Embodiment 18 | 6.7 × 10$^{11}$ | 0.3 | 10 | 10 | 85 | 80 | 94 |
| Embodiment 19 | 1.7 × 10$^{12}$ | 0.8 | 10 | 10 | 80 | 65 | 81 |
| Embodiment 20 | 1.7 × 10$^{12}$ | 0.8 | 10 | 10 | 80 | 65 | 81 |
| Embodiment 21 | 1 × 10$^{8}$ | 0.05 | 1 | 0.1 | 90 | 75 | 83 |
| Embodiment 22 | 4 × 10$^{17}$ | 12.2 | 30 | 50 | 45 | 25 | 56 |
| Embodiment 23 | 1 × 10$^{10}$ | 0.004 | 10 | 5 | 85 | 70 | 82 |
| Embodiment 24 | 4 × 10$^{17}$ | 20 | 30 | 50 | 45 | 25 | 56 |
| Embodiment 25 | 3 × 10$^{9}$ | 1.6 | 5000 | 10 | 80 | 60 | 75 |
| Embodiment 26 | 3 × 10$^{10}$ | 12.2 | 100 | 60 | 35 | 25 | 71 |
| Embodiment 27 | 3 × 10$^{12}$ | 1.6 | 10 | 10 | 60 | 45 | 75 |
| Embodiment 28 | 2 × 10$^{8}$ | 0.09 | 200 | 1 | 90 | 85 | 94 |
| Embodiment 29 | 2 × 10$^{12}$ | 0.8 | 40 | 10 | 80 | 40 | 50 |
| Embodiment 30 | 1.7 × 10$^{12}$ | 0.82 | 10 | 10 | 70 | 55 | 79 |
| Embodiment 31 | 1.7 × 10$^{12}$ | 0.8 | 10 | 10 | 80 | 65 | 81 |

TABLE 3

| | Self-discharge rate of lithium-ion battery (mV/h) | Pore occluding temperature of separation layer (° C.) | Separation layer rupturing temperature (° C.) | Difference between pore occluding temperature and separation layer rupturing temperature (° C.) | Pass rate of battery in overcharge performance test under 1 C-1.5 U constant-voltage charging | Hotbox pass rate tested at 150° C. for 1 h | Ratio of 50$^{th}$-cycle discharge capacity to first-cycle discharge capacity (%) |
|---|---|---|---|---|---|---|---|
| Comparative Embodiment 1 | 0.034 | 130 | 147 | 17 | 0/15 pass | 0/15 pass | 92.3% |
| Comparative Embodiment 2 | 0.059 | — | 178 | — | 2/15 pass | 6/15 pass | 95.5% |
| Comparative Embodiment 3 | 0.032 | 112 | 147 | 35 | 15/15 pass | 0/15 pass | 95.6% |

TABLE 3-continued

|  | Self-discharge rate of lithium-ion battery (mV/h) | Pore occluding temperature of separation layer (° C.) | Separation layer rupturing temperature (° C.) | Difference between pore occluding temperature and separation layer rupturing temperature (° C.) | Pass rate of battery in overcharge performance test under 1 C-1.5 U constant-voltage charging | Hotbox pass rate tested at 150° C. for 1 h | Ratio of 50$^{th}$-cycle discharge capacity to first-cycle discharge capacity (%) |
|---|---|---|---|---|---|---|---|
| Comparative Embodiment 4 | 0.035 | 118 | 178 | 60 | 11/15 pass | 8/15 pass | 95.8% |
| Embodiment 1 | 0.044 | — | 177 | — | 3/15 pass | 7/15 pass | 95.6% |
| Embodiment 2 | 0.028 | 122 | 176 | 54 | 8/15 pass | 9/15 pass | 95.8% |
| Embodiment 3 | 0.022 | 112 | 175 | 63 | 15/15 pass | 10/15 pass | 96.3% |
| Embodiment 4 | 0.024 | 121 | 168 | 47 | 9/15 pass | 6/15 pass | 96.1% |
| Embodiment 5 | 0.027 | 126 | 152 | 26 | 4/15 pass | 3/15 pass | 95.9% |
| Embodiment 6 | 0.023 | 112 | 302 | 190 | 15/15 pass | 11/15 pass | 96.0% |
| Embodiment 7 | 0.022 | 112 | 317 | 205 | 15/15 pass | 11/15 pass | 96.2% |
| Embodiment 8 | 0.023 | 125 | 175 | 50 | 5/15 pass | 10/15 pass | 96.1% |
| Embodiment 9 | 0.025 | 127 | 175 | 48 | 3/15 pass | 9/15 pass | 95.7% |
| Embodiment 10 | 0.032 | 122 | 175 | 53 | 8/15 pass | 10/15 pass | 95.8% |
| Embodiment 11 | 0.019 | 111 | 175 | 64 | 15/15 pass | 11/15 pass | 96.5% |
| Embodiment 12 | 0.038 | 116 | 167 | 51 | 12/15 pass | 6/15 pass | 95.3% |
| Embodiment 13 | 0.051 | 121 | 156 | 35 | 9/15 pass | 3/15 pass | 95.0% |
| Embodiment 14 | 0.037 | 125 | 160 | 35 | 5/15 pass | 4/15 pass | 94.6% |
| Embodiment 15 | 0.024 | 114 | 168 | 54 | 13/15 pass | 6/15 pass | 95.8% |
| Embodiment 16 | 0.033 | 116 | 164 | 48 | 12/15 pass | 5/15 pass | 96.8% |
| Embodiment 17 | 0.034 | 113 | 175 | 62 | 14/15 pass | 9/15 pass | 94.9% |
| Embodiment 18 | 0.036 | 122 | 165 | 43 | 8/15 pass | 6/15 pass | 96.6% |
| Embodiment 19 | 0.022 | 78 | 175 | 97 | 15/15 pass | 9/15 pass | 95.7% |
| Embodiment 20 | 0.022 | 155 | 175 | 20 | 2/15 pass | 10/15 pass | 96.1% |
| Embodiment 21 | 0.048 | — | 166 | — | 3/15 pass | 6/15 pass | 95.4% |
| Embodiment 22 | 0.029 | 123 | 158 | 35 | 7/15 pass | 3/15 pass | 94.7% |
| Embodiment 23 | 0.062 | — | 134 | — | 2/15 pass | 1/15 pass | 94.3% |
| Embodiment 24 | 0.031 | 123 | 153 | 30 | 7/15 pass | 2/15 pass | 94.8% |
| Embodiment 25 | 0.045 | 126 | 135 | 9 | 4/15 pass | 2/15 pass | 94.5% |
| Embodiment 26 | 0.027 | 125 | 134 | 9 | 5/15 pass | 3/15 pass | 94.6% |
| Embodiment 27 | 0.028 | 118 | 175 | 57 | 11/15 pass | 5/15 pass | 95.9% |
| Embodiment 28 | 0.066 | — | 154 | — | 2/15 pass | 3/15 pass | 94.2% |
| Embodiment 29 | 0.035 | 121 | 175 | 54 | 9/15 pass | 4/15 pass | 96.3% |
| Embodiment 30 | 0.017 | 111 | 178 | 67 | 15/15 pass | 12/15 pass | 96.5% |
| Embodiment 31 | 0.019 | 111 | 175 | 64 | 15/15 pass | 11/15 pass | 96.8% |

As can be seen from Table 1, Table 2, and Table 3, compared with an ordinary separator, the integrated separation layer formed by filling a nanofibrous porous substrate comprising nanofibers with low-melting-point polymer particles is thinner, so as to increase the energy density and the porosity of the separation layer, and in turn, increase the electrolyte retainability. The integrated separation layer accelerates the reaction kinetics, and in turn, enhances the electrical performance, increases the bonding force between the separation layer and the electrode plate, and makes the lithium-ion battery more resistant to mechanical abuse such as dropping. The temperature at which the pores of the separation layers can be occluded is lower, and the separation layer is more resistant to thermal shrinkage in a high-temperature environment, thereby improving the safety and stability of the lithium-ion battery.

In contrast to the heat-resistant spinning separation layer, the low-melting-point polymer particles are distributed in the nanofibrous porous substrate comprising nanofibers of the separation layer according to this application, so that the separation layer according to this application is able to occlude pores under heat at a low temperature and cut off the current in the case of thermal runaway, thereby improving safety performance of the lithium-ion battery. In addition, the low-melting-point polymer particles may fill in the "macropores" of the nanofibrous porous substrate comprising nanofibers to reduce the macropores in the purely heat-resistant spinning separation layer, thereby further alleviating the self-discharge problem of the lithium-ion battery and reducing the K value. In addition, the increased mechanical strength of the separation layer reduces the probability of internal short circuits caused by penetration through the separation layer by positive or negative active material particles in the lithium-ion battery, thereby helping to improve cycle performance of the lithium-ion battery.

In contrast to the two-layered structure of "ordinary separator+low-melting-point polymer particle separation layer", the integrated structure design halves the thickness of the separation layer, thereby greatly increasing the volumetric energy density of the lithium-ion battery. In addition, due to the high melting point and high-temperature stability of the nanofibrous porous substrate comprising nanofibers, the risks of shrinkage or even rupture of the separation layer under a high temperature are reduced, so that the lithium-ion battery achieves high safety performance. Moreover, the integrated separation layer is of a higher porosity, thereby accelerating ion transport, boosting reaction kinetics, and improving the electrical performance of the lithium-ion battery.

In contrast to the two-layered structure of "heat-resistant spinning layer+low-melting-point polymer particles", the integrated structure design reduces the thickness of the separation layer effectively, and enables the lithium-ion battery to achieve a relatively high volumetric energy density. At the same time, the low-melting-point polymer fills in the nanofibrous porous substrate comprising nanofibers, and responds more quickly in melting to occlude pores in the case of thermal runaway. In addition, the low-melting-point polymer fills the "macropores" in the nanofibrous porous substrate comprising nanofibers, optimizes the pore size distribution, alleviates the self-discharge problem of the lithium-ion battery, reduces the K value, increases the mechanical strength of the nanofibrous porous substrate comprising nanofibers, and is more resistant to penetration by positive and negative electrode particles.

What is described above is merely preferred embodiments of this application, but not intended to limit the protection scope of this application. Any modifications, equivalent replacements, improvements, and the like made without departing from the spirit and principles of this application still fall within the protection scope of this application.

What is claimed is:

1. An electrochemical device, comprising:
   an electrode plate; and
   a separation layer on at least one surface of the electrode plate;
   wherein the separation layer comprises:
   a nanofibrous porous substrate comprising nanofibers; and
   polymer particles distributed in the nanofibrous porous substrate comprising nanofibers;
   wherein a melting temperature of the polymer particles is 70° C. to 150° C.; and
   wherein the nanofibrous porous substrate is free of inorganic particles;
   wherein a surface porosity $\alpha$ of the separation layer is 48% to 90%, a cross-sectional void fraction $\beta$ of the separation layer is 45% to 85%, and a ratio $\beta/\alpha$ is less than 95%.

2. The electrochemical device according to claim 1, wherein a number of the polymer particles in the separation layer is $1\times10^8/m^2$ to $1\times10^{18}/m^2$.

3. The electrochemical device according to claim 1, wherein a number of the polymer particles in the separation layer is $1.3\times10^{13}/m^2$ to $1\times10^{18}/m^2$.

4. The electrochemical device according to claim 1, wherein an average particle diameter of the polymer particles is 40 nm to 10 μm.

5. The electrochemical device according to claim 1, wherein a part of the polymer particles protrudes from a surface of the nanofibrous porous substrate comprising nanofibers by a height of 0.1 nm to 5 μm, and a surface area occupied by the part of the polymer particles on the surface of the nanofibrous porous substrate comprising nanofibers is 0.1% to 60% of a total surface area of the nanofibrous porous substrate.

6. The electrochemical device according to claim 1, wherein polymers of the polymer particles comprise at least one of polystyrene, polyethylene, poly(ethylene-co-propylene), poly(ethylene-co-vinyl acetate), acrylonitrile-butadiene-styrene, polylactic acid, polyvinyl chloride, polyvinyl butyral, or polyacrylate.

7. The electrochemical device according to claim 1, wherein a diameter of the nanofibers is 10 nm to 5 μm, and a pore diameter of the nanofibrous porous substrate is 40 nm to 10 μm.

8. The electrochemical device according to claim 1, wherein the nanofibers comprises a polymer, and the polymer comprises at least one of polyvinylidene difluoride, polyimide, polyamide, polyacrylonitrile, polyethylene glycol, polyethylene oxide, polyphenylene oxide, polypropylene carbonate, polymethyl methacrylate, polyethylene terephthalate, polyvinylidene difluoride-hexafluoropropylene, poly(vinylidene difluoride-co-chlorotrifluoroethylene), or a derivative thereof.

9. An electronic device, comprising:
   an electrochemical device, the electrochemical device comprising:
   an electrode plate; and
   a separation layer on at least one surface of the electrode plate;
   wherein the separation layer comprises:
   a nanofibrous porous substrate comprising nanofibers; and
   polymer particles distributed in the nanofibrous porous substrate comprising nanofibers;
   wherein a melting temperature of the polymer particles is 70° C. to 150° C.; and
   wherein the nanofibrous porous substrate is free of inorganic particles;
   wherein a surface porosity $\alpha$ of the separation layer is 48% to 90%, a cross-sectional void fraction $\beta$ of the separation layer is 45% to 85%, and a ratio $\beta/\alpha$ is less than 95%.

10. The electronic device according to claim 9, wherein a number of the polymer particles in the separation layer is $1\times10^8/m^2$ to $1\times10^{18}/m^2$.

11. The electronic device according to claim 9, wherein a number of the polymer particles in the separation layer is $1.3\times10^{13}/m^2$ to $1\times10^{18}/m^2$.

12. The electronic device according to claim 9, wherein an average particle diameter of the polymer particles is 40 nm to 10 μm.

13. The electronic device according to claim 9, wherein a part of the polymer particles protrudes from a surface of the nanofibrous porous substrate by a height of 0.1 nm to 5 μm, and a surface area occupied by the part of the polymer particles on the surface of the nanofibrous porous substrate is 0.1% to 60% of a total surface area of the nanofibrous porous substrate.

14. The electronic device according to claim 9, wherein a diameter of the nanofibers is 10 nm to 5 μm.

15. The electronic device according to claim 9, wherein a pore diameter of the nanofibrous porous substrate comprising nanofibers is 40 nm to 10 μm.

* * * * *